United States Patent [19]
Weddemann et al.

[11] Patent Number: 5,321,588
[45] Date of Patent: Jun. 14, 1994

[54] MOTOR VEHICLE LAMP

[75] Inventors: Heribert Weddemann; Heing Bewernick, both of Lippstadt; Dieter Herting, Lippstadt-Hörste, all of Fed. Rep. of Germany

[73] Assignee: Hella KG Hueck & Co., Lippstadt, Fed. Rep. of Germany

[21] Appl. No.: 25,574

[22] Filed: Mar. 3, 1993

[30] Foreign Application Priority Data

Mar. 3, 1992 [DE] Fed. Rep. of Germany ....... 4206624

[51] Int. Cl.5 .............................................. B60Q 1/44
[52] U.S. Cl. ......................................... 362/61; 362/80
[58] Field of Search .................. 362/61, 83.3, 80, 227, 362/294, 800

[56] References Cited

FOREIGN PATENT DOCUMENTS 82133816 9/1982 Fed. Rep. of Germany ... I21V 5/08
3836032A1 4/1990 Fed. Rep. of Germany ... B60Q 1/26

Primary Examiner—Ira S. Lazarus
Assistant Examiner—L. Heyman
Attorney, Agent, or Firm—Griffin Butler Whisenhunt & Kurtossy

[57] ABSTRACT

The invention concerns a motor vehicle lamp which can be mounted on the exterior of a body of a vehicle. The lamp has a bowl-shaped housing whose outer rim, or edge, is fused, or welded, to a base plate. The lamp has a base, or ground, surface in the form of an elongated rectangle. A light-transmissive shield is mounted at one of two long side edges of the housing. A cross member, bar, or web, extends from an inwardly directed side of the base plate into the housing with a top edge thereof being fused to the inside surface of the housing.

6 Claims, 1 Drawing Sheet

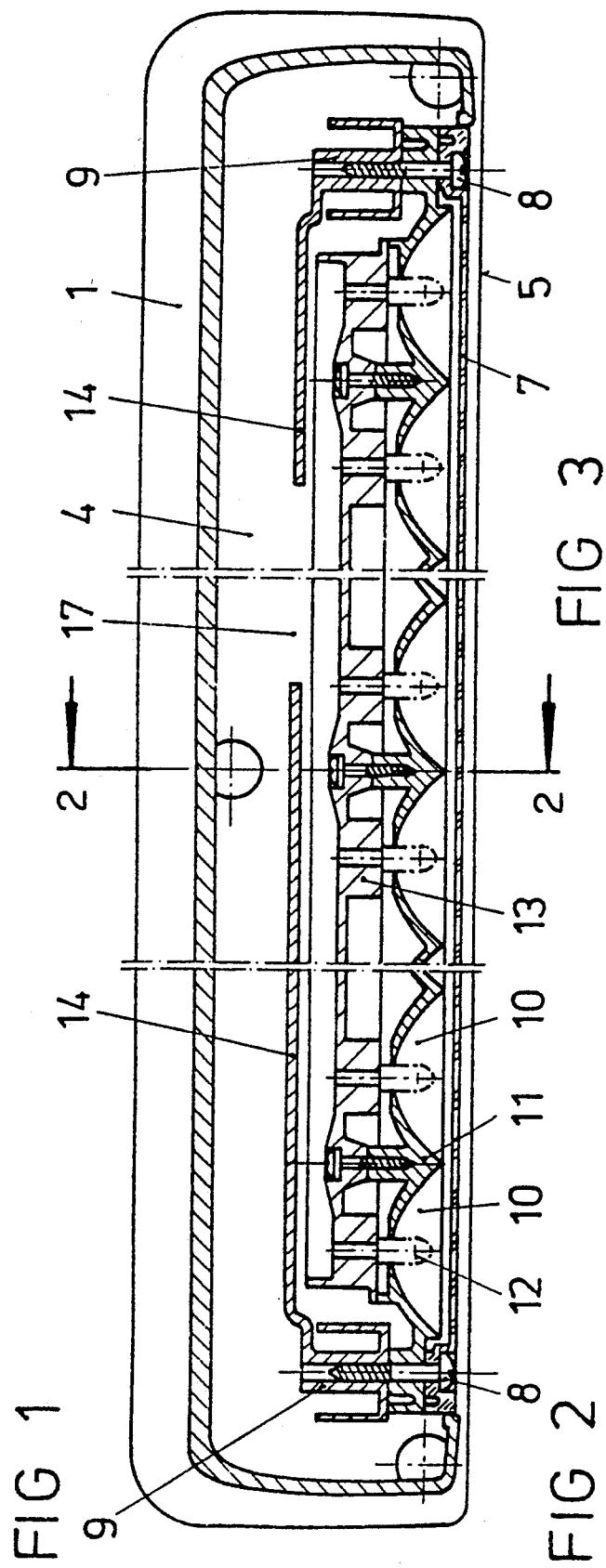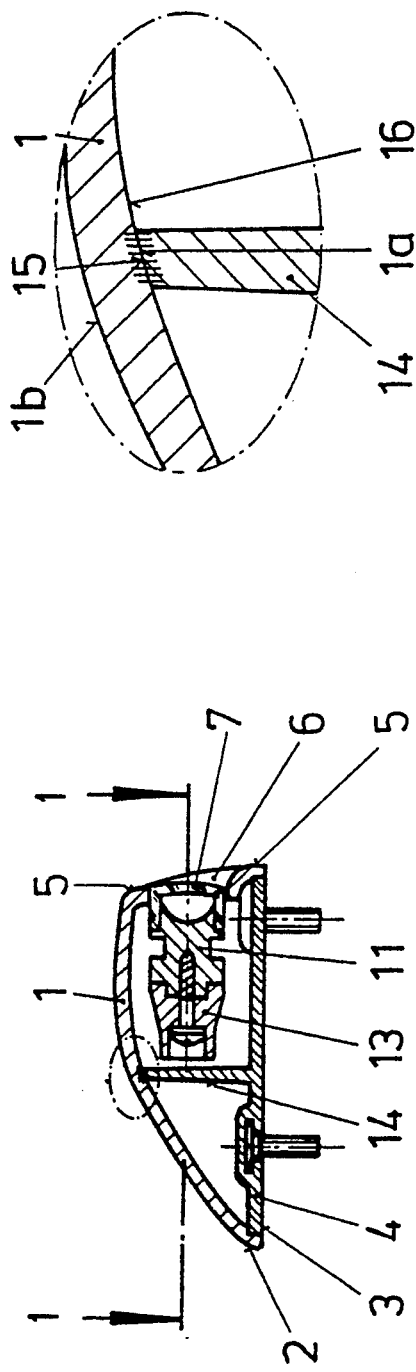

MOTOR VEHICLE LAMP

BACKGROUND OF THE INVENTION

This invention relates to a motor vehicle lamp which can be mounted to a body of a vehicle of a type in which an interior cavity is defined by a plastic base plate which is attachable to the body, a plastic bowl-shaped housing and a light-transmissive shield which is arranged at an opening of a side wall, or edge, of the housing, and of a type in which at least one cross member, or support web, is molded onto the base plate for supporting the interior of the housing resting thereon.

Such a motor vehicle lamp is known from German patent document DE-OS 38 36 032. In a motor vehicle lamp described and depicted in this publication, a base plate and thus also a free edge of a bowl-shaped housing have an approximately square shape so that the base plate and the housing individually, and even more so after assembly thereof, have a high warp resistance. This warp resistance is increased by having a light-transmissive shield arranged at a right angle to the base plate and formed, or molded, directly at the edge of the base plate, thus becoming a unit with the base plate. In order to further increase the warp resistance of such relatively small lamps, the thicknesses of base plates and housings could be increased without substantially increasing material costs. However, a sharp increase in cost would be incurred by increasing wall thicknesses in large lamps in which several different light sources have their own reflectors and are arranged in rows next to one another. In order to allow extremely thin wall thicknesses of base plates and housings for such lamps, while at the same time providing sufficient warp resistance, it is possible that one could strengthen lamp components with ribs. If a lamp of this type had strengthening ribs injected, or sprayed, onto an interior of a bowl-shaped housing, a material accumulation would occur at intersections between the ribs and an outer surface of the shell, so that shrinkage of the material during a cooling process thereof would cause indentations on the outside of the shell. This disadvantage does not occur if cross members, or webs, are formed, or molded, onto the base plate, as depicted in German patent document DE-OS 38 36 032. In this regard, the cross member, or support bar, is made with double walls and is arranged along the edge of the base plate. However, this embodiment and this location of the cross member cannot always be realized, particularly in those instances when lamps are shaped to be very flat, or slim, along their edges. Usually single-walled and thin support cross members for the base plate have to be arranged in great numbers and crossing, if possible, in order to exhibit a warp-resistance effect. However, this is not possible in most lamps because of space constraints.

It is an object of this invention to reinforce not only the base plates by means of cross members, but also the housings in such motor-vehicle lamps which vary substantially in length and width and which have thin housing and base-plate walls, without requiring that additional cross members be injected onto the housings, yet still allowing for the changing of light bulbs.

SUMMARY

According to principles of this invention, in a motor vehicle lamp whose base plate has a greater length than width, a light-transmissive shield is a separable component which can be mounted to the rest of the motor vehicle lamp, a cross member of the base plate is arranged between and parallel to both elongated sides of the base plate, a housing and the base plate are fused together along their outer edges, and, in addition, the cross member, or web, of the bas plate is fused at its outer edge to the interior of the housing wherein during fusion only the surfaces of the cross member and the housing are deformed, or softened.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a longitudinal cross-sectional view of a amp of this invention taken on line B—B in FIG. 2;

FIG. 2 is a cross-sectional view taken on line A—A in FIG. 1; and

FIG. 3 is an enlarged detailed cross-sectional view of area X in FIG. 2.

DESCRIPTION OF THE PREFERRED EMBODIMENT

The motor vehicle lamp of this invention comprises a bowl-shaped housing 1 having an outer edge 2 mounted and fused, or welded, onto an outer edge 3 of a base plate 4. The housing 1 and the base plate 4 are made of plastic. The base plate 4 and, therefore, the outer edge 2 of the bowl-shaped housing 1 are elongated and rectangular. An opening 6 is arranged at a long side, or edge, wall 5 of the housing which is closed by a light-transmissive shield 7. The light-transmissive shield 7 is fastened onto support brackets 9 by means of screws, the brackets being extruded, injection-molded, or formed, onto the base plate 4. A reflector body 11 having several individual reflectors 10 is screwed to the support brackets 9 together with the light-transmissive shield 7. Light bulbs 12 extending through the individual reflectors 10 are coupled to and held in place by a bulb holder 13 which is screwed to the reflector body 11.

A cross member, or web, 14 is injection-molded, or extruded, onto the base plate 4 and extends centrally, or axially, across the base plate, parallel to the long side wall 5 of the housing 1. An outer, or top, edge 15 of the cross member 14 is fused, or welded, to an underside, or interior surface, 16 of the housing such that during fusion only the two involved surfaces 15 and 1a are deformed, softened, or liquified, which can be achieved by friction fusing, or welding, (creating fast, vibrating, motion between these two elements, thereby causing friction to create heat and melt, or partially melt, the components for fusing them together). This ensures that an outside 1b of the housing 1 is not deformed by the fusing process.

Cutout openings 17 in the cross member 14 allow for power supply cables to reach light bulbs 12.

The cross member molded onto the base plate separates the interior of the lamp into two chambers whose longitudinal orientations are parallel to the longitudinal orientation of the base plate. Thus, the narrow and long, hollow body has a high warp resistance which is substantially increased by fusing, or welding, the cross member to the housing and the outer edges of the base plate to the housing. Despite the inseparable connection between the base plate and the housing, light bulbs can be easily changed without complications since the light-transmissive shield is a separate component and is mounted to the motor vehicle lamp in a separable, or removable, manner.

While the invention has been particularly shown and described with reference to a preferred embodiment, it will be understood by those of ordinary skill in the art that various changes in form and detail may be made therein without departing from the spirit and scope of the invention.

In one preferred embodiment of this invention, the supportive cross member, or web, which is injection molded, or otherwise molded, onto the base plate and fused to the housing, has cutout openings along its length which may be used for cables to be guided therethrough and for better air circulation between chambers formed by the cross member.

For increasing a warp resistance of a hollow body formed by a housing and base plate of this invention, several parallel and crossing cross members, or webs, can be molded onto the base plate and fused to the housing.

In another particularly beneficial embodiment of the invention, a method used for fusing the housing and the base plate is friction fusing, or welding. This method ensures that the outside of the housing remains intact, or unharmed, by the fusing process.

It is also beneficial if on an elongated, rectangular base plate the support web is arranged equidistant from elongated side edges of the base plate, because this results in a particularly high warp resistance of an elongated motor vehicle lamp. The warp resistance can be further increased when the cross member is arranged approximately centrally, or axially, to the side edges of the motor vehicle lamp.

The embodiments of the invention in which an exclusive property or privilege are claimed are defined as follows:

I claim:

1. A motor vehicle lamp, which is mountable to a vehicle body, wherein an interior space of said lamp is defined by a plastic base plate which can be mounted to said vehicle body, a bowl-shaped plastic housing, and a light-transmissive shield which is arranged at an opening of a side of said housing, wherein an interior surface of said housing rests on a cross member extending outwardly from said base plate, wherein said base plate has a greater length than width, and wherein:

said light-transmissive shield is a separate component which can be selectively mounted to other components of said motor vehicle lamp, said cross member of said base plate extends between and parallel to the elongated sides of the base plate, outer edges of said housing and said base plate are fused together and an outer edge of said cross member extending from said base plate is fused to the interior surface of said housing, with only an interface between said cross member and said housing being deformed from fusion.

2. A motor vehicle lamp as in claim 1 wherein said base plate is rectangularly shaped and said cross member is arranged to be equidistant from elongated edges of said base plate and sides of said housing.

3. A motor vehicle lamp as in claim 1 wherein said cross member has cutout openings along its length.

4. A motor vehicle lamp as in claim 1 wherein a support-bracket means for selectively mounting said light-transmissive shield is molded onto said base plate.

5. A motor vehicle lamp as in claim 1 wherein the fusing of said outer edge of said cross member to said interior surface of said housing is accomplished by friction welding.

6. A method of constructing a motor vehicle lamp to be mounted on a vehicle body comprising the steps of:

providing a plastic base plate which can be mounted to said vehicle body, said plastic base plate having a substantially rectangular, elongated, shape and having a cross-member extending outwardly from a main member of said plastic base;

providing a bowl-shaped plastic housing having an outer edge that is elongated and substantially rectangular in shape, having a form corresponding to that of said plastic base plate and having an opening at a side thereof;

providing a light-transmissive shield which fits into the opening at the side of the housing;

placing said bowl-shaped plastic housing on said plastic base plate so that an interior surface of said housing rests on an outer edge surface of said cross-member and outer edges of said housing and said base plate engage one another; and fusing said outer edge surface of said cross-member to said interior surface of said housing by means of friction welding.

* * * * *